(12) United States Patent
Yao

(10) Patent No.: US 11,345,194 B2
(45) Date of Patent: May 31, 2022

(54) METHOD AND APPARATUS FOR ACTIVATING TIRE PRESSURE SENSOR, STORAGE MEDIUM AND FRONT-END SERVER TITLE

(71) Applicant: AUTEL INTELLIGENT TECHNOLOGY CORP., LTD., Guangdong (CN)

(72) Inventor: Shiming Yao, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 82 days.

(21) Appl. No.: 16/899,110

(22) Filed: Jun. 11, 2020

(65) Prior Publication Data
US 2020/0298634 A1 Sep. 24, 2020

Related U.S. Application Data

(63) Continuation of application No. PCT/CN2018/120628, filed on Dec. 12, 2018.

(30) Foreign Application Priority Data

Dec. 13, 2017 (CN) .......................... 201711332722.7

(51) Int. Cl.
*B60C 23/04* (2006.01)
*G06V 10/10* (2022.01)

(52) U.S. Cl.
CPC ...... *B60C 23/0471* (2013.01); *B60C 23/0415* (2013.01); *B60C 23/0472* (2013.01); *G06V 10/10* (2022.01); *G06V 2201/08* (2022.01)

(58) Field of Classification Search
CPC .. G01M 17/02; G01M 17/022; G01M 17/027; G01M 17/021; G01M 17/024;
(Continued)

(56) References Cited

U.S. PATENT DOCUMENTS 6,340,929 B1 * 1/2002 Katou ................. B60C 23/0479
340/447
2003/0080860 A1 * 5/2003 Stewart ............... B60C 23/0437
340/442
(Continued)

FOREIGN PATENT DOCUMENTS

CN 1994765 A 7/2007
CN 105564162 A 5/2016
(Continued)

OTHER PUBLICATIONS

Extended European Search Report for EP 18888637.8 dated Nov. 20, 2020.
(Continued)

*Primary Examiner* — Andre J Allen

(57) ABSTRACT

The present invention provides a method and an apparatus for activating a tire pressure sensor, a storage medium and a front-end server. The method includes: obtaining a first identification number of the tire pressure sensor; determining a parameter of an activation signal according to the first identification number, the activation signal being used to activate the tire pressure sensor; and sending the activation signal to the tire pressure sensor according to the parameter. According to the method and the apparatus for activating a tire pressure sensor activation provided in the present invention, the first identification number in a one-to-one correspondence with a model of the tire pressure sensor is obtained, the parameter of the activation signal for activating the tire pressure sensor is determined using the first identification number, and the activation signal is sent according to the determined parameter to activate the tire pressure sensor, so that a plurality of automobile-related parameters do not need to be determined in advance during activation of
(Continued)

Obtain a first identification number of a tire pressure sensor — S101

Determine a parameter of an activation signal according to the first identification number — S102

Send the activation signal to the tire pressure sensor according to the parameter — S103 the tire pressure sensor, thereby improving a success rate of activating the tire pressure sensor.

18 Claims, 2 Drawing Sheets

(58) Field of Classification Search
CPC .............. G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 11/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/20; B60C 23/0444; B60C 23/0462; B60C 11/24; B60C 23/064; B60C 23/007; B60C 23/0479; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0415; B60C 23/0474; B60C 23/0489; B60C 23/0491; B60C 25/002; B60C 29/064; B60C 23/00363; B60C 23/0483; B60C 11/0318; B60C 23/0459; B60C 23/0471; B60C 23/0481; B60C 23/042; B60C 2019/005; B60C 23/002; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/065; B60C 23/00336; B60C 23/0484; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0418; B60C 23/0457; B60C 23/12; B60C 25/18; B60C 11/13; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 7/12; B60C 11/02; B60C 17/0009; B60C 19/002; B60C 19/08; B60C 19/12; B60C 19/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 7/107; B60C 9/22; G06K 19/07764; G06K 19/07749; G06K 19/0723; G06K 19/07786; G06K 19/0716; G06K 19/0717; G06K 19/07758; G06K 7/10178; G06K 7/0008; G06K 9/2054; G06K 17/00; G06K 19/04; G06K 19/0672; G06K 19/0675; G06K 19/0701; G06K 19/0726; G06K 19/07728; G06K 19/07779; G06K 19/07781; G06K 7/0013; G06K 7/10;
G06K 7/10316; G06K 7/10346; G06K
9/00832; G06K 7/10861
USPC .................................. 73/146–146.8
See application file for complete search history.

(56) References Cited

U.S. PATENT DOCUMENTS

| | | | |
|---|---|---|---|
| 2003/0197603 A1* | 10/2003 | Stewart | B60C 23/0444 |
| | | | 340/442 |
| 2006/0071768 A1* | 4/2006 | Iwazumi | B60C 23/0442 |
| | | | 340/447 |
| 2007/0279205 A1* | 12/2007 | Ide | B60C 23/0433 |
| | | | 340/447 |
| 2013/0106596 A1 | 5/2013 | Mouchet | |
| 2019/0337340 A1* | 11/2019 | Wu | B60C 23/0408 |
| 2020/0317007 A1* | 10/2020 | Wu | B60K 35/00 |
| 2021/0101421 A1* | 4/2021 | Luo | B60C 23/0461 |
| 2021/0260936 A1* | 8/2021 | Bout | B60C 23/0471 |

FOREIGN PATENT DOCUMENTS

| | | | |
|---|---|---|---|
| CN | 106585295 | | 4/2017 |
| CN | 106585295 A | | 4/2017 |
| CN | 106585296 A | | 4/2017 |
| CN | 106739863 | * | 5/2017 |
| CN | 106827975 A | | 6/2017 |
| CN | 107284155 | * | 10/2017 |
| CN | 108099511 A | | 6/2018 |
| CN | 108136861 | * | 6/2018 |
| KR | 20140099084 A | | 8/2014 |

OTHER PUBLICATIONS

The International Search Report dated Feb. 25, 2019; PCT/CN2018/120628.
The first Chinese Office action dated Aug. 15, 2019; Appln. No. 201711332722.7.

* cited by examiner

METHOD AND APPARATUS FOR ACTIVATING TIRE PRESSURE SENSOR, STORAGE MEDIUM AND FRONT-END SERVER TITLE

This application is a continuation of International Patent Application No. PCT/CN2018/120628 filed on Dec. 12, 2018, which claims priority to Chinese Patent Application No. 201711332722.7 filed on Dec. 13, 2017, both of which are incorporated by reference herein in their entireties

BACKGROUND

This application claims priority to Chinese Patent Application No. 201711332722.7, filed with the Chinese Patent Office on Dec. 13, 2017 and entitled "METHOD AND APPARATUS FOR ACTIVATING TIRE PRESSURE SENSOR, STORAGE MEDIUM AND FRONT-END SERVER", which is incorporated herein by reference in its entirety.

Technical Field

The present application relates to automobile technologies, and in particular, to a method and an apparatus for activating a tire pressure sensor, a storage medium and a font-end server.

Related Art

With the development of automobile diagnosis monitoring technologies, an automobile tire pressure monitoring technology is increasingly mature. In the tire pressure monitoring technology, working parameters such as a tire speed, a pressure and a temperature etc. are monitored in real time using a tire pressure sensor. Automobile test and maintenance personnel obtain test parameters or working parameters of an automobile through a connection to the tire pressure sensor using a tire pressure monitoring device, so as to maintain or test the automobile, so that effective safety guarantee can be provided for car driving.

In the prior art, before the tire pressure monitoring device is connected to the tire pressure sensor, a low-frequency signal required for activating the tire pressure sensor needs to be determined according to a plurality of related parameters of a to-be-tested automobile such as a model, a series and a production year, etc., and the tire pressure sensor is activated according to the determined low-frequency signal.

In the prior art, determining the low-frequency signal required for activating the tire pressure sensor requires to obtain the plurality of related parameters such as the model, the series and the production year in advance. The tire pressure sensor cannot be activated in absence of any of the parameters, leading to a low success rate of activating the tire pressure sensor.

SUMMARY

The present invention provides a method and an apparatus for activating a tire pressure sensor, a storage medium and a front-end server, improving a success rate of activating the tire pressure sensor.

The present invention provides a method for activating a tire pressure sensor, including:

obtaining a first identification number of the tire pressure sensor;

determining a parameter of an activation signal according to the first identification number, the activation signal being used to activate the tire pressure sensor; and sending the activation signal to the tire pressure sensor according to the parameter.

In an embodiment of the present invention, the first identification number is in a one-to-one correspondence with a model of the tire pressure sensor.

In an embodiment of the present invention, the determining a parameter of an activation signal according to the first identification number includes:

obtaining the parameter of the activation signal from a database according to the first identification number, the database including one-to-one correspondences between N first identification numbers and parameters of N activation signals, where N is a positive integer.

In an embodiment of the present invention, before the obtaining a first identification number of the tire pressure sensor, the method further includes:

obtaining the one-to-one correspondences between the N first identification numbers and the parameters of the N activation signals, and storing the correspondences into the database.

In an embodiment of the present invention, the method includes: when the parameter of the activation signal is not obtained from the database according to the first identification number, sending the first identification number to a matching server through the Internet, and receiving, as the parameter of the activation signal, a parameter sent by the matching server.

In an embodiment of the present invention, the method includes: when the parameter of the activation signal is not obtained from the database according to the first identification number, notifying the first identification number to the user through an interaction apparatus, and receiving, as the parameter of the activation signal, a parameter that corresponds to the first identification number and that is input by a user.

In an embodiment of the present invention, after the receiving, as the parameter of the activation signal, a parameter that corresponds to the first identification number and that is input by the user, the method further includes:

storing, into the database, a one-to-one correspondence between the first identification number and the parameter that corresponds to the first identification number and that is input by the user.

In an embodiment of the present invention, the obtaining a first identification number of the tire pressure sensor includes:

obtaining a scanned image of an automobile;

determining a model of the automobile according to the scanned image of the automobile; and determining the first identification number of the tire pressure sensor according to the model of the automobile.

In an embodiment of the present invention, the first identification number is an original equipment manufacturer (OEM).

The present invention provides an apparatus for activating a tire pressure sensor, including:

an obtaining module configured to obtain a first identification number of the tire pressure sensor;

a determining module configured to determine a parameter of an activation signal according to the first identification number, the activation signal being used to activate the tire pressure sensor; and a sending module configured to send the activation signal to the tire pressure sensor according to the parameter.

In an embodiment of the present invention, the first identification number is in a one-to-one correspondence with a model of the tire pressure sensor.

In an embodiment of the present invention, the determining module is specifically configured to obtain the parameter of the activation signal from a database according to the first identification number, the database including one-to-one correspondences between N first identification numbers and parameters of N activation signals, where N is a positive integer.

In an embodiment of the present invention, the obtaining module is further configured to obtain the one-to-one correspondences between the N first identification numbers and the parameters of the N activation signals, and store the correspondences into the database.

In an embodiment of the present invention, the determining module is further configured to: when the parameter of the activation signal is not obtained from the database according to the first identification number, send the first identification number to a matching server through the Internet, and receive, as the parameter of the activation signal, a parameter sent by the matching server.

In an embodiment of the present invention, the determining module is further configured to: when the parameter of the activation signal is not obtained from the database according to the first identification number, notify the first identification number to a user through an interaction apparatus.

The determining module is further configured to receive, as the parameter of the activation signal, a parameter that corresponds to the first identification number and that is input by the user.

In an embodiment of the present invention, the determining module is further configured to store, into the database, a one-to-one correspondence between the first identification number and the parameter that corresponds to the first identification number and that is input by the user.

In an embodiment of the present invention, the obtaining module is specifically configured to:

obtain a scanned image of an automobile;

determine a model of the automobile according to the scanned image of the automobile; and determine the first identification number of the tire pressure sensor according to the model of the automobile.

In an embodiment of the present invention, the first identification number is an OEM.

The present invention provides a storage medium storing a computer program thereon, when the computer program is executed by a processor, the method for activating a tire pressure sensor according to any of the foregoing embodiments being implemented.

The present invention provides a front-end server, including:

a processor; and a memory configured to store an executable instruction of the processor, where the processor is configured to perform the method for activating a tire pressure sensor according to any of the foregoing embodiments by executing the executable instruction.

In an embodiment of the present invention, the front-end server is an apparatus for activating a tire pressure sensor.

The present invention provides a method and an apparatus for activating a tire pressure sensor, a storage medium and a front-end server. The method includes: obtaining a first identification number of the tire pressure sensor; determining a parameter of an activation signal according to the first identification number, the activation signal being used to activate the tire pressure sensor; and sending the activation signal to the tire pressure sensor according to the parameter. According to the method and the apparatus for activating a tire pressure sensor activation provided in the present invention, the first identification number in a one-to-one correspondence with a model of the tire pressure sensor is obtained, the parameter of the activation signal for activating the tire pressure sensor is determined using the first identification number, and the activation signal is sent according to the determined parameter to activate the tire pressure sensor, so that a plurality of automobile-related parameters do not need to be determined in advance during activation of the tire pressure sensor, thereby improving a success rate of activating the tire pressure sensor.

The foregoing accompanying drawings show specific embodiments of this disclosure, and more detailed descriptions are provided in the following. The accompanying drawings and text descriptions are not intended to limit the scope of the idea of this disclosure in any form, but are intended to explain the concept of this disclosure to a person skilled in the art with reference to particular embodiments.

DETAILED DESCRIPTION

The following clearly and completely describes the technical solutions in the embodiments of the present invention with reference to the accompanying drawings in the embodiments of the present invention. Obviously, the described embodiments are only some embodiments instead of all embodiments of the present invention. All other embodiments obtained by a person of ordinary skill in the art based on the embodiments of the present invention without creative effects shall fall within the protection scope of the present disclosure.

The terms "first", "second", "third", "fourth", and the like (if exists) in the specification and the claims of the present disclosure and the foregoing accompanying drawings are used for distinguishing similar objects, and do not need to be used for describing a particular sequence or order. It should be understood that data used in this way is interchangeable in a suitable case, so that the embodiments of the present disclosure described herein can be implemented in a sequence in addition to the sequence shown or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The following describes technical solutions of the present invention in detail with reference to specific embodiments. The following specific embodiments may be mutually combined, and same or similar concepts or processes may not be repeatedly described in some embodiments.

Figure 1:
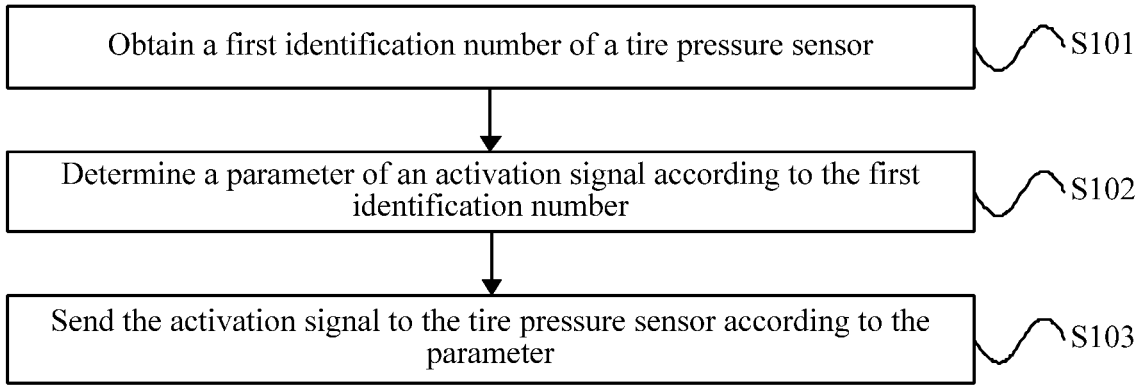
FIG. 1 is a schematic flowchart of Embodiment 1 of a method for activating a tire pressure sensor according to present invention.

FIG. 1 is a schematic flowchart of Embodiment 1 of a method for activating a tire pressure sensor according to present invention. As shown in FIG. 1, the method for activating a tire pressure sensor provided in this embodiment includes the following steps.

S101: A first identification number of the tire pressure sensor is obtained.

Specifically, this embodiment may be performed by an electronic device that can activate the tire pressure sensor, such as a mobile phone, a computer and a tire pressure monitoring device, etc., which serves as an apparatus for activating the tire pressure sensor. Different models of tire pressure sensors are selected for existing automobiles of different models and even existing automobiles of a same model produced in different years. During a connection to a tire pressure sensors to obtain test parameters or working parameters of an automobile to maintain or test the automobile, the tire pressure sensor used for the automobile of the model needs to be determined according to a plurality of related parameters, such as the model, a series, and a production year, and then parameters of an activation signal required for activating the tire pressure sensor are determined. The apparatus for activating the tire pressure sensor can obtain, using the first identification number, information such as the model, the type and the signal required for activating the tire pressure sensor. For example, the first identification number may be a number such as a factory setting number or a production serial number, etc. of a tire or an automobile on which the tire is mounted.

Optionally, the first identification number is in a one-to-one correspondence with a model of the tire pressure sensor. For example, the first identification number may be a number in a one-to-one correspondence with the model of the tire pressure sensor, such as a factory setting number, a production serial number, and an identification number, and different types of tire pressure sensors correspond to different first identification numbers.

For example, the activation signal is a low frequency signal.

S102: A parameter of an activation signal is determined according to the first identification number, the activation signal being used to activate the tire pressure sensor.

Specifically, the parameter of the activation signal required for activating the tire pressure sensor is determined according to the first identification number obtained in S101. Since a first identification number corresponds to a unique tire pressure sensor, a tire pressure sensor also corresponds to a unique activation signal. Therefore, in this step, a unique activation signal can be matched using the first identification number. The activation signal is used to activate the tire pressure sensor.

Optionally, the parameter of the activation signal may be: a frequency, an amplitude, a phase, a modulation manner, an encoding manner and/or encryption manner, etc. of the activation signal.

Optionally, after the model of the tire pressure sensor is determined using the first identification number, the parameter of the activation signal is determined according to the model of the tire pressure sensor. The parameter of the activation signal may also be directly determined using the first identification number. No limitation is imposed in this embodiment.

S103: The activation signal is sent to the tire pressure sensor according to the parameter.

Specifically, the activation signal is sent to the tire pressure sensor according to the parameter of the activation signal obtained in S102, to activate the tire pressure sensor through the activation signal.

After receiving the activation signal, the tire pressure sensor sends a response signal to the device that sends the activation signal, and establishes a connection relationship with the apparatus. Related automobile maintenance and repair personnel may control and detect the tire pressure sensor through a device connected to the tire pressure sensor, and may further perform communication programming on the tire pressure sensor.

According to the method for activating a tire pressure sensor, the first identification number of the tire pressure sensor is obtained; the parameter of the activation signal is determined according to the first identification number, the activation signal being used to activate the tire pressure sensor; and the activation signal is sent to the tire pressure sensor according to the parameter. According to the method for activating a tire pressure sensor activation provided in this embodiment, the first identification number is obtained, the parameter of the activation signal for activating the tire pressure sensor is determined using the first identification number, and the activation signal is sent according to the determined parameter to activate the tire pressure sensor, so that a plurality of automobile-related parameters do not need to be determined in advance during activation of the tire pressure sensor, thereby improving a success rate of activating the tire pressure sensor.

Figure 2:
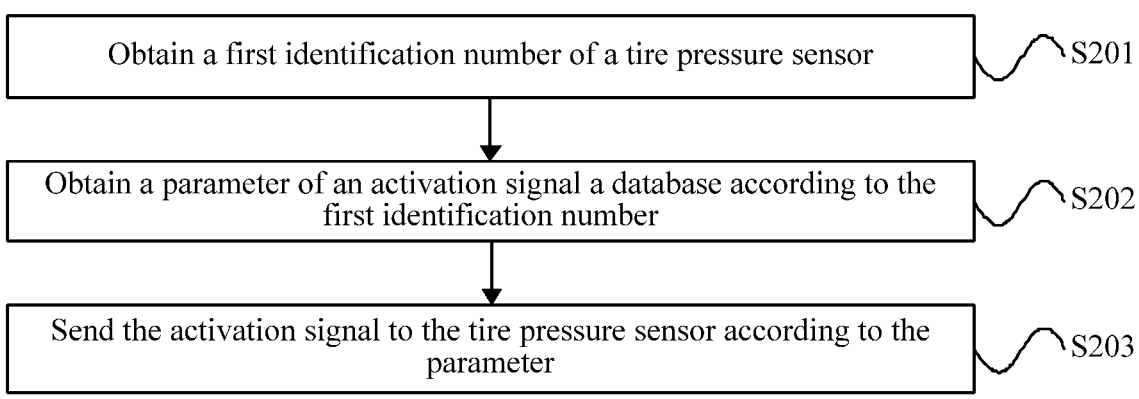
FIG. 2 is a schematic flowchart of Embodiment 2 of a method for activating a tire pressure sensor according to present invention.

FIG. 2 is a schematic flowchart of Embodiment 2 of a method for activating a tire pressure sensor according to present invention. As shown in FIG. 1, based on the embodiment of the method for activating a tire pressure sensor shown in FIG. 1, the method for activating a tire pressure sensor provided in this embodiment includes the following steps.

S201: A first identification number of the tire pressure sensor is obtained, the first identification number being in a one-to-one correspondence with a model of the tire pressure sensor.

A specific implementation and an implementation principle of this step are the same as those of S101, and details are not described herein again.

S202: The parameter of the activation signal is obtained from a database according to the first identification number, the database including one-to-one correspondences between N first identification numbers and parameters of N activation signals, where N is a positive integer.

Specifically, a parameter of an activation signal matching the first identification number is searched in the database according to the first identification number obtained in S201. The database includes the one-to-one correspondences between the N first identification numbers and the parameters of the N activation signals.

For example, the database includes three first identification numbers, which are recorded as A, B and C. A parameter of an activation signal corresponding to the first identification number A is a, a parameter of an activation signal corresponding to the second identification number B is b and a parameter of an activation signal corresponding to the third identification number C is c. In this case, when the first identification number is A, the parameter a of the activation signal corresponding to A is searched in the correspondence stored in the database according to A. When the first identification number is B, the parameter b of the activation signal corresponding to B is searched in the correspondence stored in the database according to B. When the first identification number is C, the parameter c of the activation signal corresponding to C is searched in the correspondence stored in the database according to C.

S203: The activation signal is sent to the tire pressure sensor according to the parameter.

A specific implementation and an implementation principle of this step are the same as those of S103, and details are not described herein again.

Figure 3:
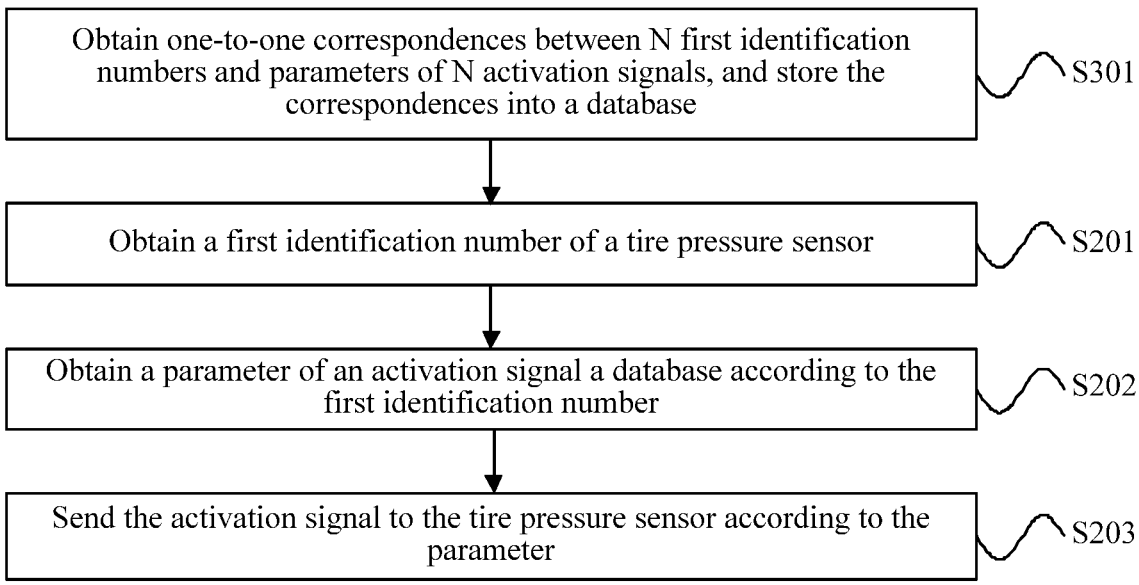
FIG. 3 is a schematic flowchart of Embodiment 3 of a method for activating a tire pressure sensor according to present invention.

FIG. 3 is a schematic flowchart of Embodiment 3 of a method for activating a tire pressure sensor according to present invention. As shown in FIG. 3, based on the embodiment of the method for activating a tire pressure sensor shown in FIG. 2, before step S201, the method for activating a tire pressure sensor provided in this embodiment further includes the following steps.

S301: The one-to-one correspondences between the N first identification numbers and the parameters of the N activation signals are obtained, and the correspondences are stored into the database.

Specifically, before S201, the database may be initialized through this step, and the one-to-one correspondence is stored into the database to be called.

Optionally, the one-to-one correspondences between the N first identification numbers that may be used by a user and that are input by the user and the parameters of the N activation signals are received, and the one-to-one correspondences are stored into the database. During matching and verification performed on the first identification number in step S202, the one-to-one correspondences are called from the database.

Optionally, the one-to-one correspondences may also be obtained through a connection to the Internet. For example, the one-to-one correspondences between the N first identification numbers and the parameters of the N activation signals are obtained from a matching server through the Internet and stored into the database.

Optionally, the method in the foregoing embodiment further includes:

when the parameter of the activation signal is not obtained from the database according to the first identification number, sending the first identification number to a matching server through the Internet, and receiving, as the parameter of the activation signal, a parameter sent by the matching server.

Specifically, if the parameter of the activation signal corresponding to the first identification number is not found through matching in the database according to the first identification number, the first identification number may be sent to the matching server through the Internet and a communication apparatus in the apparatus for activating a tire pressure sensor.

A database of a matching server established and maintained by an automobile manufacturer or a tire manufacturer is relatively comprehensive and has a storage capacity much larger than a storage capacity of a database of an ordinary electronic device. Therefore, the matching server determines, according to the first identification number, the parameter of the activation signal required for activating the tire pressure sensor.

After obtaining the parameter of the activation signal, the matching server returns the parameter of the activation signal corresponding to the first identification number to the device that sends the first identification number. The device that sends the first identification number then receives the parameter sent by the matching server, and uses the received parameter as the parameter of the activation signal.

Optionally, after the receiving the parameter of the activation signal sent by the matching server, the method further includes: establishing a one-to-one correspondence between the first identification number that is sent and the received parameter of the activation signal, and storing the one-to-one correspondence into the database.

Optionally, the method in the foregoing embodiment further includes:

when the parameter of the activation signal is not obtained from the database according to the first identification number, notifying the first identification number to a user through an interaction apparatus; and receiving, as the parameter of the activation signal, a parameter that corresponds to the first identification number and that is input by the user.

Specifically, if the parameter of the activation signal corresponding to the first identification number is not found through matching in the database according to the first identification number, a notification may be sent to the user through the interaction apparatus in the apparatus for activating a tire pressure sensor. The interaction apparatus may be a display screen, a display device, a tablet computer, a signal lamp and a reminder, etc.

For example, If the parameter of the activation signal corresponding to the first identification number is not found through matching in the database, "No such number, please check" is displayed on the display screen, or a red indicator light flashes to notify the user that there is no parameter of the activation signal corresponding to the first identification number.

In this case, the user inputs the parameter of the activation signal corresponding to the first identification number through an input device. The input device may be a keyboard, a mouse and a touch screen, etc.

After the parameter of the activation signal that corresponds to the first identification number and that is input by the user is received, the device that sends the first identification number then receives the parameter sent by the user, and uses the received parameter as the parameter of the activation signal.

Optionally, in this embodiment, a one-to-one correspondence between the first identification number that is sent and the received parameter of the activation signal is established, and the one-to-one correspondence is stored into the database.

Optionally, in the foregoing embodiment, S101 specifically includes:

obtaining a scanned image of an automobile;

determining a model of the automobile according to the scanned image of the automobile; and determining the first identification number of the tire pressure sensor according to the model of the automobile.

Specifically, a whole body of the automobile or a fixed position on the automobile may be scanned by a camera of the electronic device to obtain a scanned image of the part.

Then the model of the automobile is determined based on the scanned image, and the first identification number of the tire pressure sensor used in the automobile is determined based on the model.

Optionally, in the foregoing various embodiments, the first identification number is an original equipment manufacturer (OEM for short).

Figure 4:
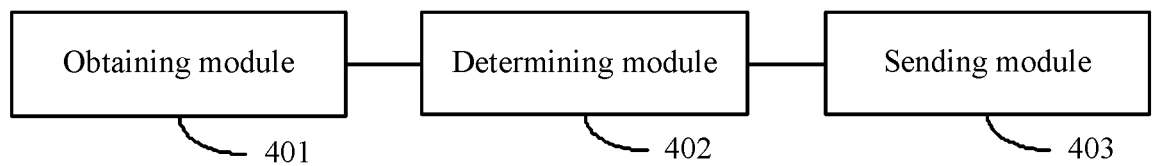
FIG. 4 is a schematic structural diagram of Embodiment 1 of an apparatus for activating a tire pressure sensor according to present invention.

FIG. 4 is a schematic structural diagram of Embodiment 1 of an apparatus for activating a tire pressure sensor according to present invention. As shown in FIG. 4, the apparatus for activating a tire pressure sensor in this embodiment includes:

an obtaining module 401, a determining module 402, and a sending module 403.

The obtaining module 401 is configured to obtain a first identification number of the tire pressure sensor.

The determining module 402 is configured to determine a parameter of an activation signal according to the first identification number, the activation signal being used to activate the tire pressure sensor.

The sending module 403 is configured to send the activation signal to the tire pressure sensor according to the parameter.

Optionally, in the foregoing embodiment, the first identification number is in a one-to-one correspondence with a model of the tire pressure sensor.

The apparatus for activating a tire pressure sensor provided in this embodiment is configured to implement the method for activating a tire pressure sensor shown in FIG. 1. An implementation and a principle thereof are the same as the above, and details are not described again.

Optionally, in the foregoing embodiment, the determining module 402 is specifically configured to obtain the parameter of the activation signal from a database according to the first identification number, the database including one-to-one correspondences between N first identification numbers and parameters of N activation signals, where N is a positive integer.

Optionally, in the foregoing embodiment, the obtaining module 401 is further configured to obtain the one-to-one correspondences between the N first identification numbers and the parameters of the N activation signals, and store the correspondences into the database.

The apparatus for activating a tire pressure sensor provided in this embodiment is configured to implement the method for activating a tire pressure sensor shown in FIG. 2 and FIG. 3. An implementation and a principle thereof are the same as the above, and details are not described again.

Optionally, in the foregoing embodiment, the determining module is further configured to: when the parameter of the activation signal is not obtained from the database according to the first identification number, send the first identification number to a matching server through the Internet, and receive, as the parameter of the activation signal, a parameter sent by the matching server.

Optionally, in the foregoing embodiment, the determining module is further configured to: when the parameter of the activation signal is not obtained from the database according to the first identification number, notify the first identification number to a user through an interaction apparatus.

The determining module is further configured to receive, as the parameter of the activation signal, a parameter that corresponds to the first identification number and that is input by the user.

In an embodiment of the present invention, the determining module is further configured to store, into the database, a one-to-one correspondence between the first identification number and the parameter that corresponds to the first identification number and that is input by the user.

In an embodiment of the present invention, the obtaining module is specifically configured to:

obtain a scanned image of an automobile;

determine a model of the automobile according to the scanned image of the automobile; and determine the first identification number of the tire pressure sensor according to the model of the automobile.

Optionally, in the foregoing various embodiments, the first identification number is an OEM.

The apparatus for activating a tire pressure sensor provided in this embodiment is configured to implement the method for activating a tire pressure sensor recorded in the foregoing embodiment. An implementation and a principle thereof are the same as the above, and details are not described again.

An embodiment of the present invention further provides a storage medium storing a computer program thereon, when the computer program is executed by a processor, the method for activating a tire pressure sensor according to any of the foregoing embodiments being implemented.

An embodiment of the present invention further provides a front-end server, including:

a processor; and a memory configured to store an executable instruction of the processor, where the processor is configured to perform the method for activating a tire pressure sensor according to any of the foregoing embodiments by executing the executable instruction.

Optionally, the front-end server in the foregoing embodiment is an apparatus for activating a tire pressure sensor.

An embodiment of the present invention further provides a device for activating a tire pressure sensor, including: a memory, a processor, and a computer program. The computer program is stored in the memory, and the processor runs the computer program to perform the method for activating a tire pressure sensor in the foregoing embodiments.

An embodiment of the present invention further provides a storage medium, including: a readable storage medium and a computer program. The computer program is stored on the readable storage medium, and the computer program is used to implement the method for activating a tire pressure sensor in the foregoing embodiments.

An embodiment of the present invention further provides a program product. The program product includes a computer program (that is, an execution instruction). The computer program is stored in a readable storage medium. At least one processor of an encoding device may read the computer program from the readable storage medium, and the at least one processor executes the computer program to cause the encoding device to implement the method for activating a tire pressure sensor provided in the foregoing various embodiments.

A person of ordinary skill in the art may understand that: all or some of the steps of the foregoing method embodiments may be implemented by a program instructing relevant hardware. The aforementioned program may be stored in a computer-readable storage medium. During execution of the program, the steps of the foregoing method embodiments are performed; and the aforementioned storage medium includes: various media that can store program code, such as a ROM, a RAM, a magnetic disk, or an optical disc.

Finally, it should be noted that: the foregoing embodiments are merely intended for describing the technical solutions of the present invention other than limiting the present invention. Although the present invention is described in detail with reference to the foregoing embodiments, a person of ordinary skill in the art should understand that: they may still make modifications to the technical solutions described in the foregoing embodiments or make equivalent replacements to some or all technical features thereof. However, such modifications or replacements do not cause the essence of corresponding technical solutions to depart from the scope of the technical solutions of the embodiments of the present invention.

What is claimed is:

1. A method for activating a tire pressure sensor, comprising:
   obtaining a first identification number of the tire pressure sensor;
   determining a parameter of an activation signal according to the first identification number, the activation signal being used to activate the tire pressure sensor; and
   sending the activation signal to the tire pressure sensor according to the parameter;
   wherein the first identification number is in a one-to-one correspondence with a model of the tire pressure sensor.

2. The method according to claim 1, wherein the determining a parameter of an activation signal according to the first identification number comprises:
   obtaining the parameter of the activation signal from a database according to the first identification number, the database comprising one-to-one correspondences between N first identification numbers and parameters of N activation signals, wherein N is a positive integer.

3. The method according to claim 2, wherein before the obtaining a first identification number of the tire pressure sensor, the method further comprises:
   obtaining the one-to-one correspondences between the N first identification numbers and the parameters of the N activation signals, and storing the correspondences into the database.

4. The method according to claim 2, comprising: when the parameter of the activation signal is not obtained from the database according to the first identification number, sending the first identification number to a matching server through the Internet, and receiving, as the parameter of the activation signal, a parameter sent by the matching server.

5. The method according to claim 2, comprising: when the parameter of the activation signal is not obtained from the database according to the first identification number, notifying the first identification number to a user through an interaction apparatus; and
   receiving, as the parameter of the activation signal, a parameter that corresponds to the first identification number and that is input by the user.

6. The method according to claim 5, wherein after the receiving, as the parameter of the activation signal, a parameter that corresponds to the first identification number and that is input by the user, the method further comprises:
   storing, into the database, a one-to-one correspondence between the first identification number and the parameter that corresponds to the first identification number and that is input by the user.

7. The method according to claim 1, wherein the obtaining a first identification number of the tire pressure sensor comprises:
   obtaining a scanned image of an automobile;
   determining a model of the automobile according to the scanned image of the automobile; and
   determining the first identification number of the tire pressure sensor according to the model of the automobile.

8. The method according to claim 1, wherein the first identification number is an original equipment manufacturer (OEM).

9. A device for activating a tire pressure sensor, including:
a processor, and a memory storing a computer program executable by the processor; wherein when the computer program is executed by the processor, the processor is configured to:
   obtain a first identification number of the tire pressure sensor;
   determine a parameter of an activation signal according to the first identification number, the activation signal being used to activate the tire pressure sensor; and
   send the activation signal to the tire pressure sensor according to the parameter;
   wherein the first identification number is in a one-to-one correspondence with a model of the tire pressure sensor.

10. The device according to claim 9, wherein
the processor is further configure to: obtain the parameter of the activation signal from a database according to the first identification number, the database comprising one-to-one correspondences between N first identification numbers and parameters of N activation signals, wherein N is a positive integer.

11. The device according to claim 10, wherein
the processor is further configure to: obtain the one-to-one correspondences between the N first identification numbers and the parameters of the N activation signals, and store the correspondences into the database.

12. The device according to claim 10, wherein
the processor is further configured to: when the parameter of the activation signal is not obtained from the database according to the first identification number, sending the first identification number to a matching server through the Internet, and receiving, as the parameter of the activation signal, a parameter sent by the matching server.

13. The device according to claim 10, wherein
the processor is further configured to: when the parameter of the activation signal is not obtained from the database according to the first identification number, notifying the first identification number to a user through an interaction apparatus; and
   the processor is further configured to receive, as the parameter of the activation signal, a parameter that corresponds to the first identification number and that is input by the user.

14. The device according to claim 13, wherein
the processor is further configured to store, into the database, a one-to-one correspondence between the first identification number and the parameter that corresponds to the first identification number and that is input by the user.

15. The device according to claim 9, the processor is specifically configured to:
   obtain a scanned image of an automobile;
   determine a model of the automobile according to the scanned image of the automobile; and
   determine the first identification number of the tire pressure sensor according to the model of the automobile.

16. The device according to claim 9, wherein
the first identification number is an original equipment manufacturer (OEM).

17. A front-end server, comprising:
a processor; and
a memory configured to store an executable instruction of the processor, wherein
the processor is configured to
obtain a first identification number of the tire pressure sensor;

determine a parameter of an activation signal according to the first identification number, the activation signal being used to activate the tire pressure sensor; and send the activation signal to the tire pressure sensor according to the parameter;

wherein the first identification number is in a one-to-one correspondence with a model of the tire pressure sensor.

18. The front-end server according to claim 17, wherein the front-end server is an apparatus for activating a tire pressure sensor.

* * * * *